(12) United States Patent
Chiu

(10) Patent No.: US 7,187,914 B2
(45) Date of Patent: Mar. 6, 2007

(54) RECTIFIERS AND RECTIFYING METHODS FOR USE IN TELECOMMUNICATIONS DEVICES

(75) Inventor: Janice Chiu, Tustin, CA (US)

(73) Assignee: Broadcom Corporation, Irvine, CA (US)

( * ) Notice: Subject to any disclaimer, the term of this patent is extended or adjusted under 35 U.S.C. 154(b) by 404 days.

(21) Appl. No.: 10/820,812

(22) Filed: Apr. 9, 2004

(65) Prior Publication Data
US 2005/0227655 A1 Oct. 13, 2005

(51) Int. Cl.
*H04B 17/00* (2006.01)

(52) U.S. Cl. .............................. 455/226.2; 455/226.4; 455/234.1; 330/279

(58) Field of Classification Search ............... 455/341, 455/226.1–226.4, 234.1; 330/277, 297, 279
See application file for complete search history.

(56) References Cited

U.S. PATENT DOCUMENTS

| | | | |
|---|---|---|---|
| 4,219,778 A * | 8/1980 | Ishii ........................... 455/205 |
| 4,513,209 A * | 4/1985 | Tanabe et al. ................ 327/58 |
| 4,578,820 A * | 3/1986 | Highton ..................... 455/226.2 |
| 5,875,390 A * | 2/1999 | Brehmer et al. ......... 455/226.2 |
| 5,893,028 A * | 4/1999 | Brehmer et al. ............ 455/313 |
| 6,311,049 B1 * | 10/2001 | Yoshizawa ............... 455/250.1 |
| 6,360,086 B2 * | 3/2002 | Wagemans ............... 455/226.4 |
| 6,603,960 B1 * | 8/2003 | Oida et al. ............... 455/115.3 |
| 2004/0038657 A1 * | 2/2004 | Bae ......................... 455/226.2 |

* cited by examiner

*Primary Examiner*—Edward F. Urban
*Assistant Examiner*—Blane J Jackson
(74) *Attorney, Agent, or Firm*—Squire, Sanders & Dempsey, LLP.

(57) ABSTRACT

A signal strength indicator circuit including a set of rectifiers. The set of rectifiers include an asymmetric switching pair of rectifiers that may be configured to provide an output signal that is inversely proportional to an input signal obtained from a device in a telecommunications system. The pair may be connected directly on one side thereof to a power supply and may be connected on another side thereof to the power supply through a resistor. Also, a method of processing a signal received by a signal strength indicator circuit.

20 Claims, 5 Drawing Sheets

RECTIFIERS AND RECTIFYING METHODS FOR USE IN TELECOMMUNICATIONS DEVICES

BACKGROUND OF THE INVENTION

1. Field of the Invention

Certain embodiments of the present invention are directed generally to rectifiers that may be included in electronic circuits in telecommunications devices. Certain other embodiments of the present invention are directed at methods of operating telecommunications with such rectifiers.

2. Description of the Related Art

Rectifiers, which are typically used to transform alternating currents (AC) into direct currents (DC), are commonly included in the circuitry of telecommunications devices. More specifically, when included in a telecommunications device, rectifiers are commonly used to transform the AC component of signals received by the device, which typically take the form of radio frequency (RF) signals having a voltage component, into DC signals that may more easily be processed within the device. Examples of telecommunication device circuits where rectifiers are commonly included are Received Signal Strength Indicator (RSSI) and/or Transmitted Signal Strength Indicator (TSSI) circuits.

FIG. 1 illustrates a schematic representation of a rectifier configuration according to the related art. The rectifier configuration schematically represented in FIG. 1 may be found in RSSI circuits, TSSI circuits, or other circuits commonly found in telecommunications devices.

In operation, the rectifier configuration illustrated in FIG. 1 receives the AC component of a signal received by the telecommunications device that includes the configuration. The AC component of the received signal enters the configuration through signal inputs 100 and is rectified using asymmetric switching pair of rectifiers 110. Once rectified, the information in the AC component is output from the configuration as a DC signal through signal output 120. The DC signal output from signal output 120 is then further processed in the circuit that includes the configuration illustrated in FIG. 1.

It should be noted that the rectifier configuration illustrated in FIG. 1 is appropriately biased using biasing circuitry 130, which is operably connected to asymmetric switching pair 110. How much biasing circuitry 130 biases the rectifier configuration is dependent on the particulars of the system in which the rectifier configuration is included.

Also illustrated in FIG. 1 is current mirror 140, which is operably connected between asymmetric switching pair 110 and signal output 120. Current mirror 140 regulates the amount of current that flows to signal output 120, and thereby promotes proper operation of the rectifier configuration.

Power supply voltage 150 is operably connected to asymmetric switching pair 110 in order to allow signals output from signal output 120 to compensate for fluctuations in the power supply voltage 150 over time. However, as illustrated in FIG. 1, power supply voltage 150 is operably connected to a first side of asymmetric switching pair 110 through first Positive-Channel Metal Oxide. Semiconductor (PMOS) device 160 and to a second side of asymmetric switching pair 110 through second PMOS device 170. In addition, third PMOS device 180 is operably connected to signal output 120. Hence, the signal output from signal output 120 is susceptible to fluctuations of first PMOS device 160, second PMOS device 170, and third PMOS device 180 related to process variations, temperature variations, and/or fluctuations of power supply voltage. At least in view of the above, certain rectifier configurations, such as, for example, the configuration illustrated in FIG. 1, are not ideally suited to being incorporated into telecommunications devices.

SUMMARY OF THE INVENTION

According to certain embodiments of the present invention, a signal strength indicator circuit is provided. The circuit generally includes a signal input for receiving an input signal and a set of rectifiers that normally include an asymmetric switching pair of rectifiers for providing an output signal that is inversely proportional to the input signal, wherein a first side of the asymmetric switching pair is operably connected to a power supply through a resistor. The circuit typically also includes a signal output for outputting the output signal.

According to certain other embodiments of the present invention, a method of processing a signal entering a signal strength indicator circuit is provided. The method usually includes the steps of receiving an input signal and rectifying the input signal through a set of rectifiers that includes an asymmetric switching pair of rectifiers to generate an output signal that is inversely proportional to the input signal. The method commonly also includes the steps of stabilizing the output signal by operably connecting a first side of the asymmetric switching pair to a power supply through a resistor and outputting the output signal.

According to yet other embodiments of the present invention, a signal strength indicator circuit is provided. This circuit typically includes receiving means for receiving an input signal and rectifying means for providing an output signal that is inversely proportional to the input signal, the rectifying means usually including an asymmetric switching pair of rectifiers operably connected on a first side thereof to a power supply through a resistor. The circuit also commonly includes outputting means for outputting the output signal.

BRIEF DESCRIPTION OF THE DRAWINGS

For a proper understanding of the invention, reference should be made to the accompanying drawings, wherein.

DETAILED DESCRIPTION OF THE PREFERRED EMBODIMENTS

Figure 2:
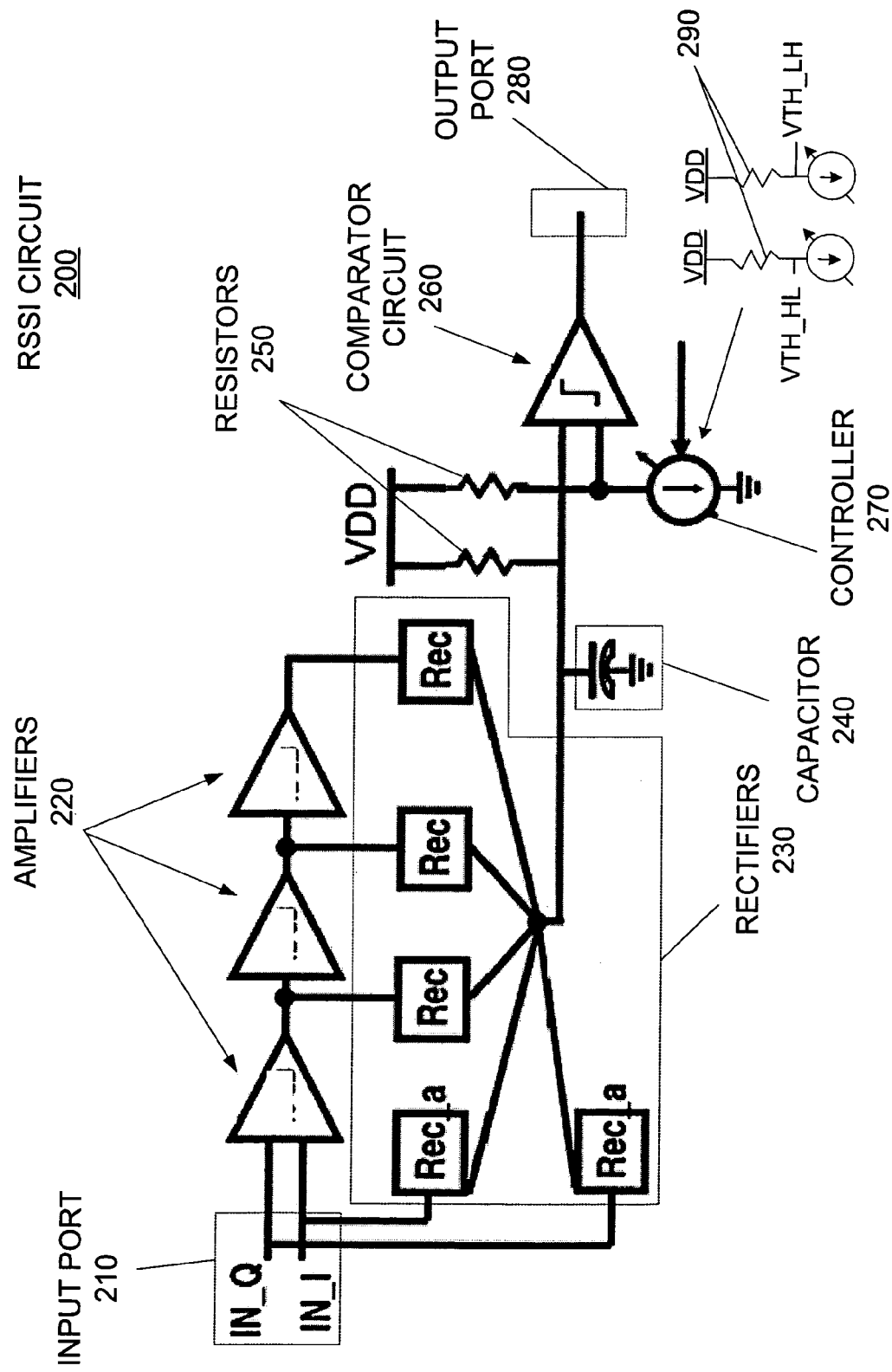
FIG. 2 illustrates a schematic representation of a signal strength indicator circuit that includes rectifiers according to certain embodiments of the present invention.

FIG. 2 illustrates a schematic representation of a Received Signal Strength Indicator (RSSI) circuit 200 that may be included in telecommunications devices according to certain embodiments of the present invention. In operation, circuit 200 receives signals through input port 210. The signals received at input port 210 are typically AC components of RF signals received by a telecommunication device that includes circuit 200.

Usually, before reaching input port 210, an AC component has been amplified by an amplifier such as, for example, a Low-Noise Amplifier (LNA) that is operably connected to input port 210. After amplification, the AC component is typically mixed down to an Intermediate Frequency (IF) by one or more mixers that are operably connected between the amplifier and input port 210.

Figure 1:
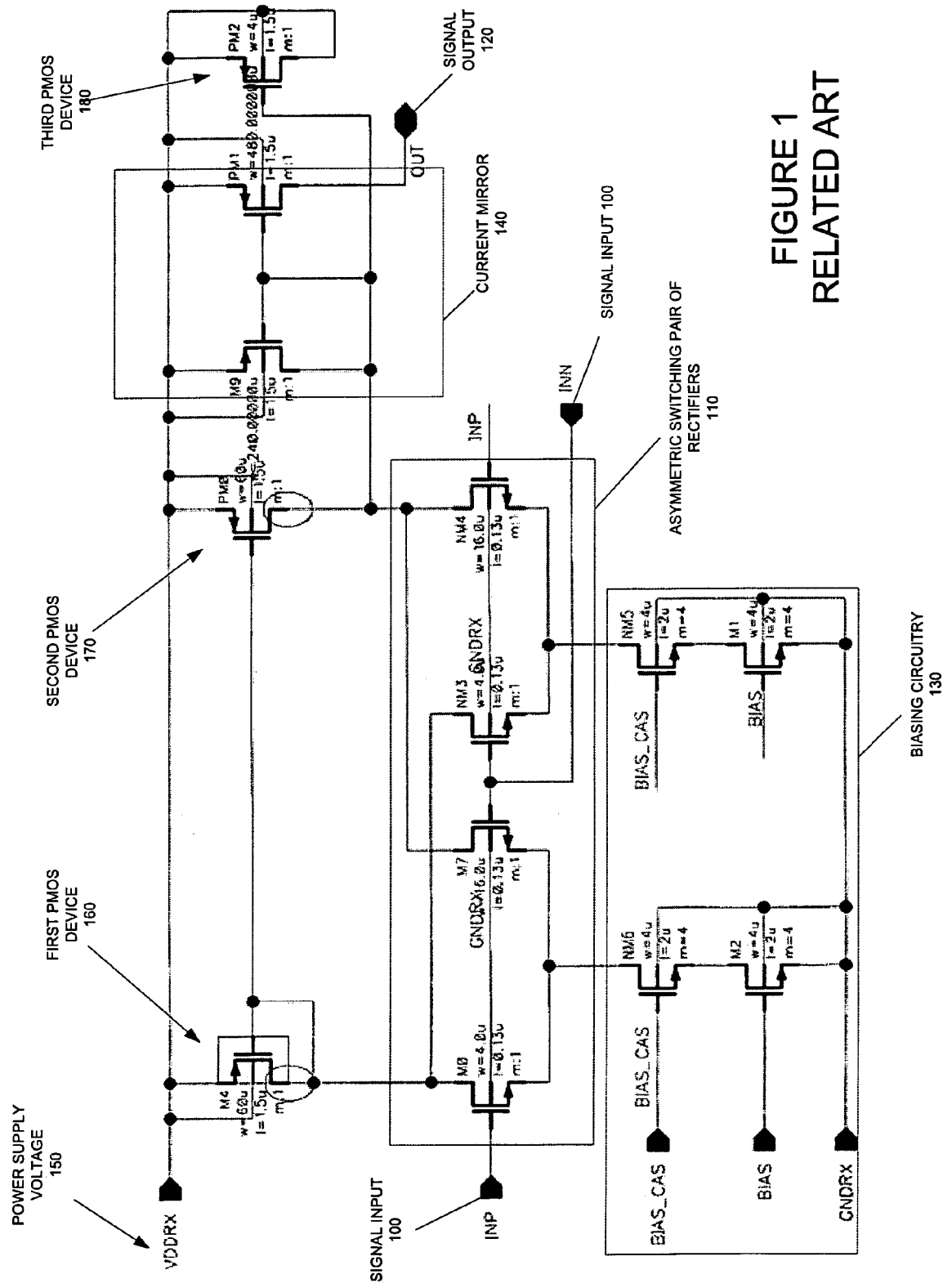
FIG. 1 illustrates a schematic representation of a rectifier configuration according to the related art.

As illustrated in FIG. 1, circuit 200 may receive both a Q input signal (IN_Q) and an I input signal (IN_I) from an IQ mixer that may be operably connected to input port 210. Generally, the Q input signal and the I input signal are 90° out of phase with each other.

In FIG. 2, input port 210 is operably connected to set of amplifiers 220, which includes three amplifiers, and set of rectifiers 230, which includes five rectifiers. It should be noted that the amplifier closest to input port 210 in set of amplifiers 220 typically receives both the I input signal and the Q input signal and combines these signals before interacting with the other amplifiers in set of amplifiers 220. Hence, instead of providing separate paths for the two received signals, in RSSI circuit 200, both signals are channeled through a single amplification path. This feature of circuit 200 greatly reduces the amount of physical area covered by circuit 200 which, in turn, allows for circuit 200 to be cooled more easily and allows for circuit 200 to utilize less power than RSSI circuits wherein the I input signal and the Q input signal are provided separate paths.

As shown in FIG. 2, two of the rectifiers in set of rectifiers 230 each receive either the I input signal or the Q input signal discussed above directly from an IQ mixer. In contrast, all of the other rectifiers in set of rectifiers 230 receive signals wherein the information previously included in I input signal and Q input signal has been combined. Therefore, in circuit 200, the two rectifiers that receive either the I input signal or the Q input signal draw approximately half of the current as the other rectifiers in set of rectifiers 230.

Circuit 200 includes capacitor 240 which is operably connected to set of rectifiers 230 and to two resistors 250. Capacitor 240 and resistors 250 make up a resistor-capacitor (RC) filter that filters and smoothes the output port of rectifiers 230 and/or the input to the comparator circuit 260 illustrated in FIG. 2, which is operably connected to resistors 250. Resistors 250, as illustrated in FIG. 2, are operably connected between set of rectifiers 230 and the power supply (VDD) of circuit 200. The use of resistors 250 to connect to VDD provides additional stability to circuit 200, thereby reducing and/or eliminating the influence of power supply voltage fluctuations on the signal output by the rectifiers in set of rectifiers 230.

Also included in circuit 200 is comparator circuit 260, which is operably connected to set of rectifiers 230, controller 270, and output port 280. Once the above-discussed I and Q input signals have been combined and processed by set of amplifiers 220 and set of rectifiers 230, a signal is typically forwarded to comparator circuit 260. Comparator circuit 260 then compares the signal it receives with one or more threshold values stored in comparator circuit 260.

If, for example, the signal it receives exceeds a first threshold value, comparator circuit 260 may determine that the I and Q input signals are too weak to be processed by circuit 200 without losing information. On the other hand, if the received signal is below a second threshold value, comparator circuit 260 may determine that the I and Q input signals are too strong to be processed by circuit 200 without causing circuit saturation. However, if the received signal is between the above-discussed first and second threshold values, comparator circuit 260 may determine that the I and Q input signals are in a range voltage and/or current range that allows for circuit 200 to operate properly.

When the I and Q signals have been determined to be either too strong or too weak, comparator circuit 260 forwards a signal to output port 280. This signal ultimately causes the gain of the amplifier that led to the I and Q input signals being forwarded from the above-discussed IQ mixer to input port 210 to be switched. On the other hand, if the I and Q input signals are in a range that allows circuit 200 to operate properly, comparator circuit 260 may either forward a signal through output port 280 confirming that no amplifier gain changes need to be made or may not forward any signal at all.

Controller 270 is typically used to set and/or modify the threshold values stored in comparator circuit 260. Controller 270 may also be used to adjust other variables related to comparator circuit 260.

Figure 3:
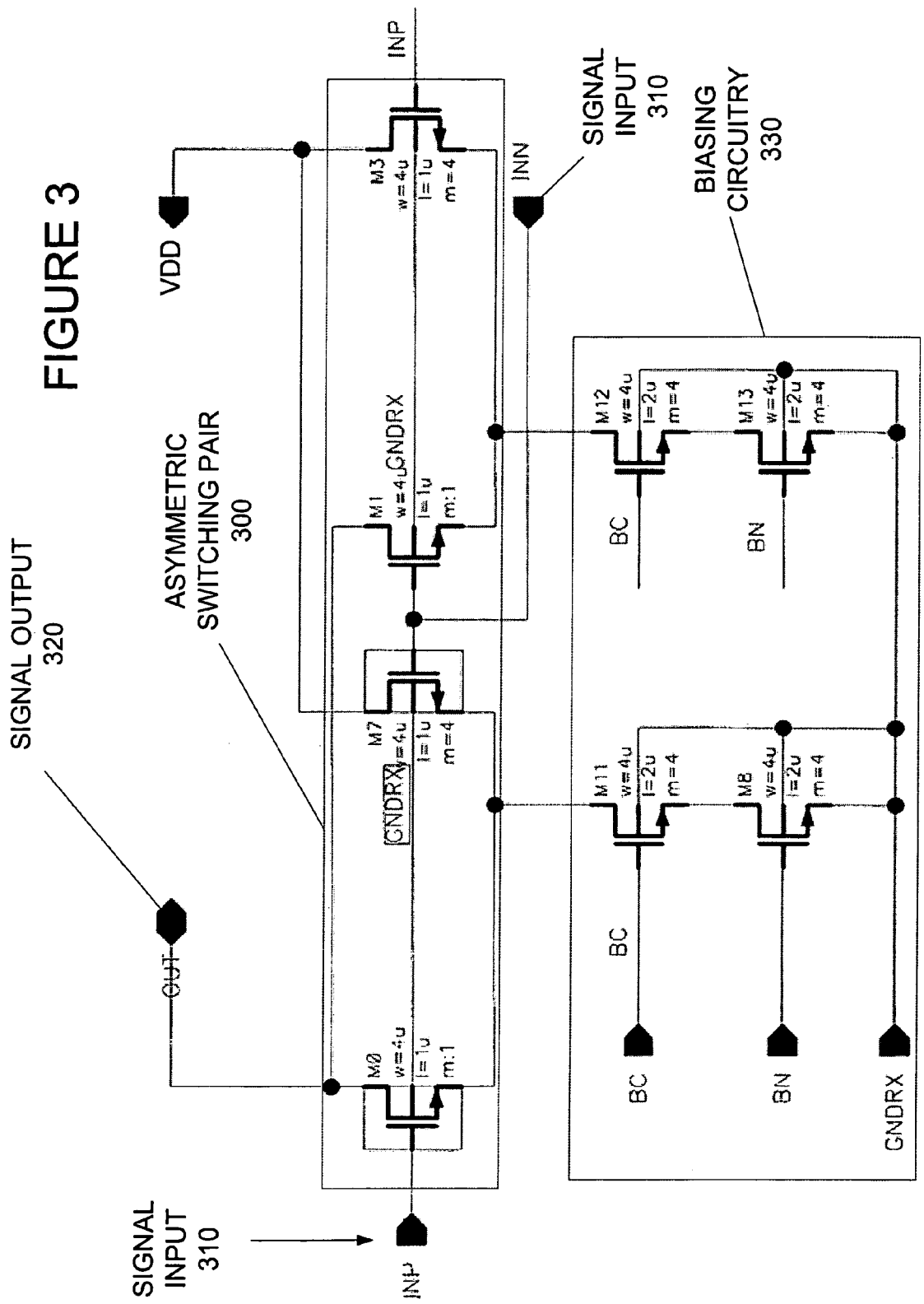
FIG. 3 illustrates a schematic representation of a rectifier configuration, according to certain embodiments of the present invention, that may be included in the signal strength indicator circuit illustrated in FIG. 2.

FIG. 3 illustrates a schematic representation of a rectifier configuration according to certain embodiments of the present invention. The rectifier configuration illustrated in FIG. 3 may be used, for example, as any one, any plurality, or all of the rectifiers in set of rectifiers 230 illustrated in FIG. 2.

The rectifier configuration illustrated in FIG. 3 includes asymmetric switching pair of rectifiers 300 that is operably connected to signal inputs 310 and signal output 320. According to certain embodiments of the present invention, the asymmetric switching pair of rectifiers 300 is configured to receive an input signal through signal inputs 310 and to provide an output signal through signal output 320 that is inversely proportional to the input signal.

The rectifier configuration illustrated in FIG. 3 may be used, for example, as one of the rectifier in the set of rectifiers 230 in FIG. 2 that directly receives either the I input signal or the Q input signal from the above-discussed IQ mixer. The rectifier configuration illustrated in FIG. 3 may also be used, for example, as one of the rectifiers in set of rectifiers 230 that receives an input signal from an amplifier in the set of amplifiers 220. In addition, the rectifier configuration illustrated in FIG. 3 may be used in other circuits where it would be apparent to those skilled in the art to use such a configuration.

Operably connected to asymmetric switching pair 300 is biasing circuit 330. How much biasing circuit 330 biases switching pair 300 is dependent on the particulars of the circuit and/or system in which the rectifier configuration illustrated in FIG. 3 is included. However, biasing circuit 330 generally allows for asymmetric switching pair 300 to operate at a current level that is similar to the current level of other circuit/system components.

As illustrated on the right-hand side of FIG. 3, a first side of asymmetric switching pair 300 may be operably connected directly to a power supply (VDD). As illustrated on the left-hand side of FIG. 3, particularly when signal output 320 is operably connected to capacitor 240 in FIG. 2, signal output 320 may be operably connected to VDD through resistors 250. Hence, in operation, a signal from signal output 320 may then be sent to comparator circuit 260, whose controller 270, as illustrated in FIG. 2, provides switching threshold voltages that are also a function of VDD.

For example, the voltage signal at signal output 320 ($V_{OUT\_320}$) may be equal to VDD-$I_{BIAS\_CIR}R_{250}$, where $I_{BIAS\_CIR}$ is a tail current from biasing circuit 330 and $R_{250}$ is the resistance of resistors 250, and the threshold output voltage ($V_{OUT\_THRESHOLD}$) may equal (VDD-$I_{THRESHOLD}R_{290}$), where $I_{THRESHOLD}$ is the threshold current and $R_{290}$ is the resistance of resistors 290. This implies that output signal 320, as well as the right-hand side output of asymmetric switching pair 300 and comparator controller 270, whose configuration, such as the one illustrated in FIG. 3, is incorporated into a circuit such as RSSI circuit 200, are all tracking the variation of power supply (VDD) over time. Hence, the signal output from output port 280 is also stabilized.

Among the reasons that the above-discussed connection allows for relatively stable signals to be output from the rectifier configuration illustrated in FIG. 3 is that, as the voltage of the power supply (VDD) fluctuates over time, the rectifier configuration illustrated in FIG. 3 also fluctuates in a proportional manner. Hence, power supply voltage is effectively compensated for and a signal output 320 that is relatively steady over time is capable of being output.

In the rectifier portion 230 that is illustrated in FIG. 2, a set of rectifiers is included. According to certain embodiments of the present invention, all of the rectifier outputs 320 of the rectifiers in the rectifier portion are typically shorted and operably connected to VDD through a resistor.

The connection of the above-discussed signal output 320 on the left-hand side of FIG. 3 to VDD provides signal stability that is additional to the signal stability provided by the connection of the right-hand side of FIG. 3 to VDD. More specifically, the connection of the left-hand side of FIG. 3 to VDD stabilizes signals output from signal output 320 with respect to process variations. This additional stability may be explained by the fact that, unlike in the rectifier configuration according to the related art illustrated in FIG. 1, output signals from the rectifier configuration illustrated in FIG. 3 are not influenced by changes in PMOS devices 160, 170, 180 as a function of process variations.

At least in view of the above, the rectifier configuration illustrated in FIG. 3 provides a substantially stable output signal. In addition, when incorporated into a circuit such as, for example, RSSI circuit 200, the rectifier configuration illustrated in FIG. 3 improves signal stability in the entire circuit, and in telecommunication devices that include the circuit. Discussed below are representative methods of using the above-discussed rectifier configurations, circuits, and devices discussed herein.

Figure 4:
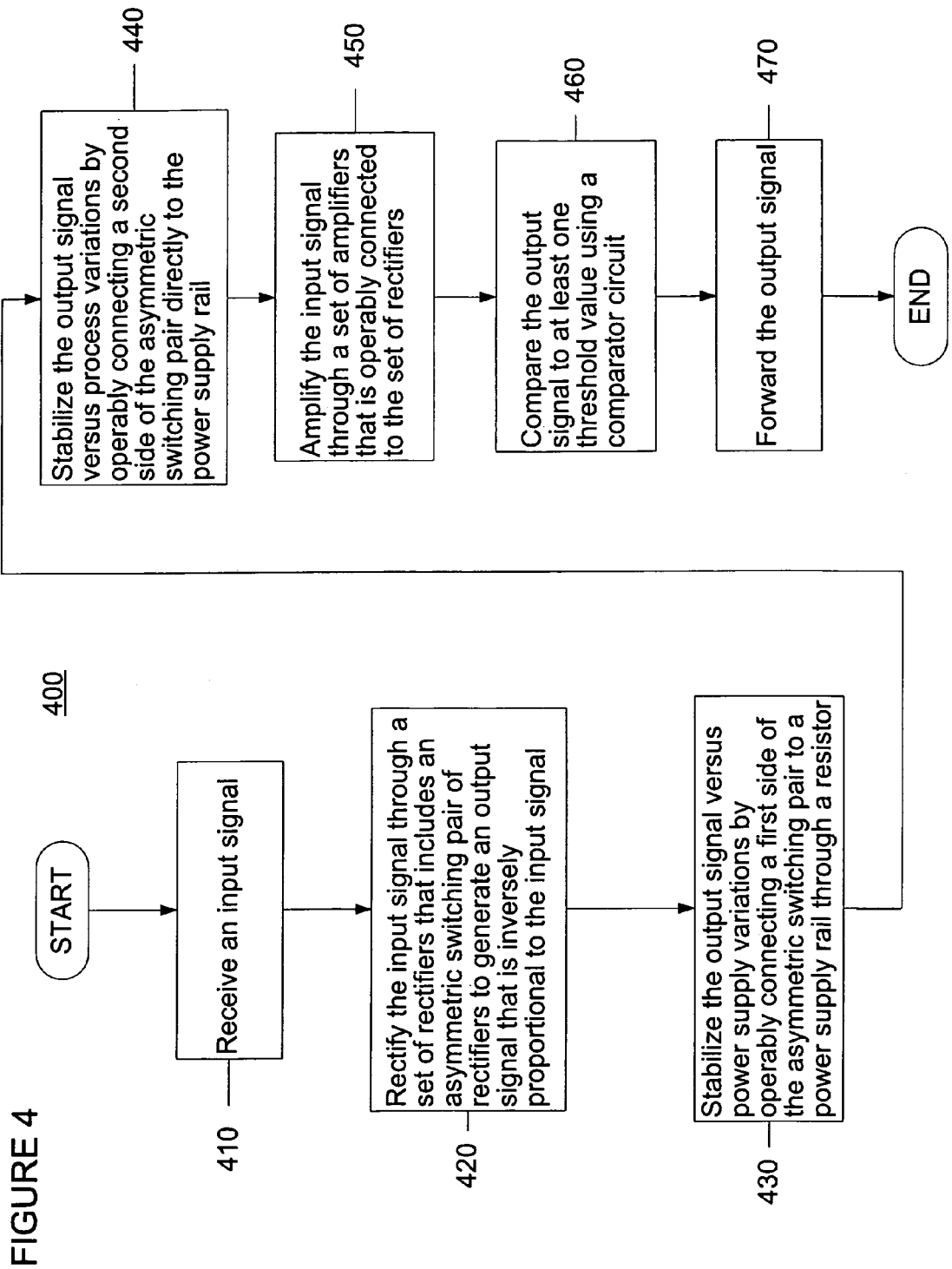
FIG. 4 illustrates a flowchart that includes the steps of a method of processing a signal received by a signal strength indicator circuit according to certain embodiments of the present invention.

FIG. 4 illustrates a flowchart 400 that includes steps that may be used to process a signal received by a signal strength indicator circuit, such as, for example, RSSI circuit 200, according to certain embodiments of the present invention. Step 410 includes receiving an input signal. The input signal may be received, for example, at input port 210. As shown in FIG. 2, the input signal received during step 410 may be received as two or more portions, such as a first portion from an I signal from a mixer and a second portion as a Q signal from a mixer. When two portions are received from an IQ mixer, the first portion and the second portion may be, for example, 90° out of phase with each other.

Step 420 includes rectifying the input signal through a set of rectifiers that includes an asymmetric switching pair of rectifiers to generate an output signal that is inversely proportional to the input signal. According to certain embodiments of the present invention, step 420 may be accomplished by incorporating the rectifier configuration illustrated in FIG. 3 as one or more of the rectifiers in set of rectifiers 230 in RSSI circuit 200.

Step 430 includes stabilizing the output signal versus power supply variations by operably connecting a first side of the asymmetric switching pair directly to a power supply. For example, in FIG. 3, the right-hand side of asymmetric switching pair 300 is directly connected to VDD.

Step 440 includes further stabilizing the output signal versus process variations by operably connecting a second side of the asymmetric switching pair to the power supply through a resistor. Step 440 may be implemented by the circuit illustrated in FIG. 3, particularly when signal output 320 is operably connected to resistors 250 illustrated in FIG. 2.

Step 450 includes amplifying the input signal through a set of amplifiers that is operably connected to the set of rectifiers. This step may be satisfied by including set of amplifiers 220 illustrated in FIG. 2.

Step 460 includes comparing the output signal to at least one threshold value using a comparator circuit. Step 460 may also include comparing the output signal to at least two threshold values using the comparator circuit. Then, step 470 includes forwarding the output signal.

When the steps of the above-described method are performed, signals may be received in a signal strength indicator circuit such as, for example, RSSI circuit 200. The received signals will lead to the creation of stable output signals from circuit 200 and for improved circuit operation.

Figure 5:
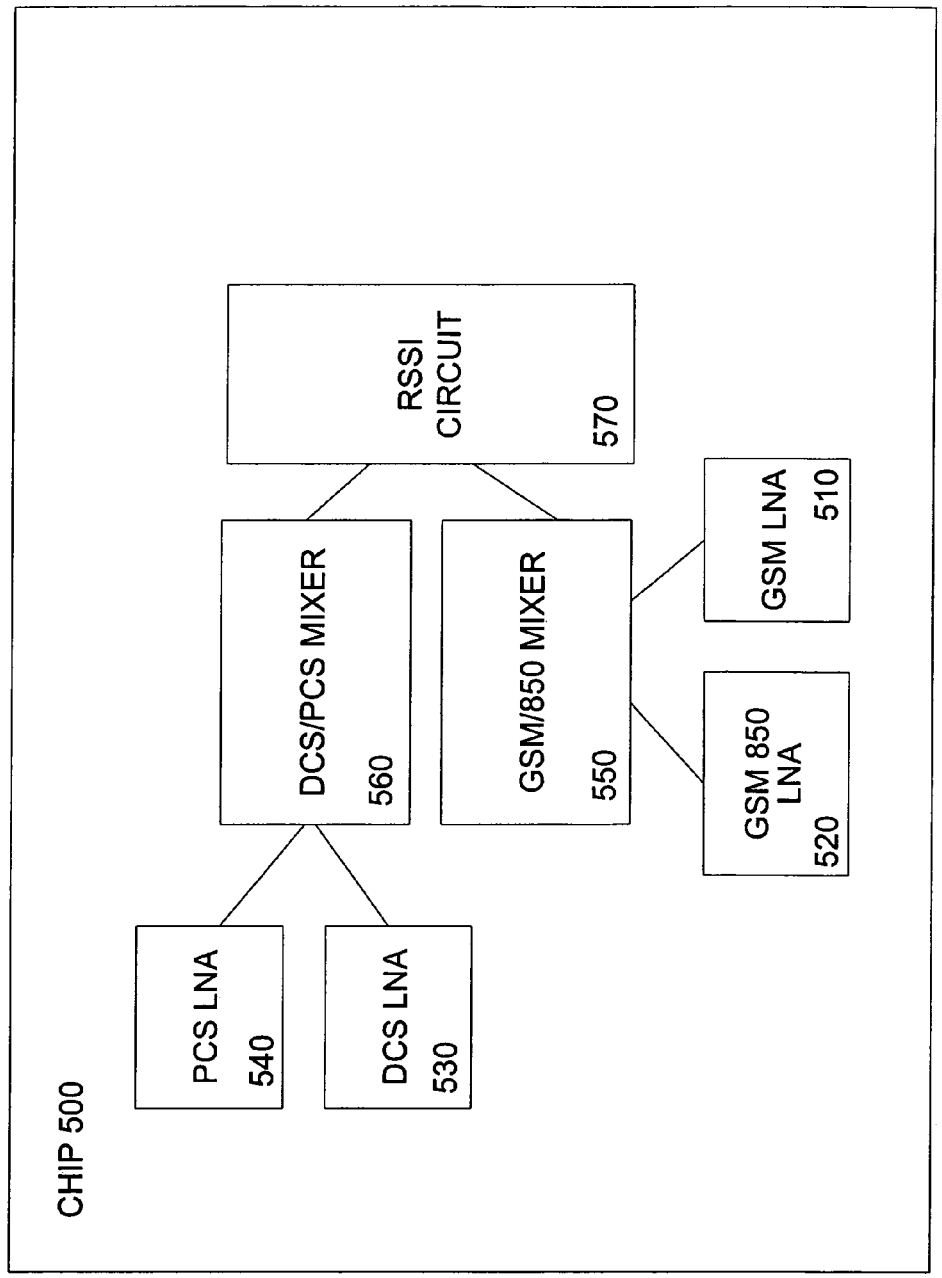
FIG. 5 illustrates a representative chip on which a Received Signal Strength Indicator (RSSI) circuit according to certain embodiments of the present invention may be included.

FIG. 5 illustrates a representative chip 500 on which a Received Signal Strength Indicator (RSSI) circuit according to certain embodiments of the present invention may be included. As illustrated in FIG. 5, four low-noise amplifiers (LNAs) 510, 520, 530, 540, each configured to receive telecommunications signals in different frequency ranges, are operably connected to two mixers 550, 560. According to certain embodiments of the present invention, first LNA 510 is a GSM LNA, second LNA 520 is a GSM850 LNA, third LNA 530 is a DCS LNA, and fourth LNA 540 is a PCS LNA. Also, according to certain embodiments first mixer 550 is a GSM/850 mixer to which first and second LNAs 510, 520 are operably connected and second mixer 560 is a DCS/PCS mixer to which third and fourth LNAs 530, 540 are operably connected.

In chip 500, first and second mixers 550, 560 are operably connected to circuit 570, which may include RSSI circuit 200 illustrated in FIG. 2. It should be noted that, in the embodiment of the present invention, the area of chip 500 covered by the LNAs 510, 520, 530, 540, mixers 550, 560 and circuit 570 is greatly reduced, as compared to conventional RSSI or TSSI circuits.

One having ordinary skill in the art will readily understand that the invention, as discussed above, may be practiced with steps in a different order, and/or with hardware elements in configurations which are different than those which are disclosed. Therefore, although the invention has been described based upon certain preferred embodiments, it would be apparent to those of skill in the art that certain modifications, variations, and alternative constructions would be appropriate, while remaining within the spirit and scope of the invention. In order to determine the metes and bounds of the invention, therefore, reference should be made to the appended claims.

I claim:

1. A signal strength indicator circuit, comprising:
    a signal input for receiving an input signal;
    a set of rectifiers including an asymmetric switching pair of rectifiers for providing an output signal that is inversely proportional to the input signal, wherein a first side of the asymmetric switching pair is operably connected to a power supply through a resistor; and a signal output for outputting the output signal.

2. The circuit of claim 1, wherein a second side of the pair of rectifiers is operably connected directly to the power supply.

3. The circuit of claim 2, wherein, when the circuit is in operation, the second side of the asymmetric switching pair of rectifiers emits the output signal.

4. The circuit of claim 1, further comprising a set of amplifiers that are operably connected to the set of rectifiers.

5. The circuit of claim 1, further comprising a comparator circuit that is operably connected to the set of rectifiers.

6. The circuit of claim 1, wherein the signal input is configured to receive a first portion of the input signal from a first mixer and a second portion of the input signal from a second mixer.

7. The circuit of claim 6, wherein the signal input is configured to receive the first portion and the second portion of the input signal, and wherein the first portion and the second portion are 90° out of phase with each other.

8. A method of processing a signal received by a signal strength indicator circuit, the method comprising the steps of:

receiving an input signal;

rectifying the input signal through a set of rectifiers that includes an asymmetric switching pair of rectifiers to generate an output signal that is inversely proportional to the input signal;

stabilizing the output signal by operably connecting a first side of the asymmetric switching pair to a power supply through a resistor; and outputting the output signal.

9. The method of claim 8, further comprising the step of:

stabilizing the output signal versus process variations by operably connecting a second side of the asymmetric switching pair directly to the power supply.

10. The method of claim 9, wherein the rectifying step comprises generating the output signal at the second side of the asymmetric switching pair.

11. The method of claim 8, further comprising the step of amplifying the input signal through a set of amplifiers.

12. The method of claim 8, further comprising the step of comparing the output signal to at least one threshold value.

13. The method of claim 12, wherein the comparing step further comprises comparing the output signal to at least two threshold values using the comparator circuit.

14. The method of claim 8, wherein the receiving step comprises receiving a first portion of the input signal from a first mixer and a second portion of the input signal from a second mixer.

15. The method of claim 14, wherein the receiving step comprises receiving the first portion and the second portion of the input signal, and wherein the first portion and the second portion of the input signal are 90° out of phase with each other.

16. A signal strength indicator circuit, comprising:

receiving means for receiving an input signal;

rectifying means for providing an output signal that is inversely proportional to the input signal, the rectifying means including an asymmetric switching pair of rectifiers operably connected on a first side thereof to a power supply through a resistor; and outputting means for outputting the output signal.

17. The circuit of claim 16, wherein the asymmetric switching pair of rectifiers included in the rectifying means is operably connected, on a second side thereof, directly to the power supply.

18. The circuit of claim 16, further comprising amplifying means for amplifying signals in the circuit, wherein the amplifying means are operably connected to the rectifying means.

19. The circuit of claim 16, further comprising comparing means for comparing the output signal to at least one threshold value, wherein comparing means are operably connected to the rectifying means.

20. The circuit of claim 16, wherein the receiving means is configured to receive a first portion of the input signal from a first mixer and a second portion of the input signal from a second mixer.

* * * * *